United States Patent
Wang et al.

(10) Patent No.: US 10,715,639 B2
(45) Date of Patent: Jul. 14, 2020

(54) DATA PROCESSING METHOD AND APPARATUS FOR PERFORMING PROTOCOL PARSING IN A CLOUD

(71) Applicant: BEIJING BAIDU NETCOM SCIENCE AND TECHNOLOGY CO., LTD., Beijing (CN)

(72) Inventors: Zhi Wang, Beijing (CN); Youjun Yuan, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 242 days.

(21) Appl. No.: 15/428,739

(22) Filed: Feb. 9, 2017

(65) Prior Publication Data
US 2018/0007173 A1    Jan. 4, 2018

(30) Foreign Application Priority Data
Jul. 1, 2016    (CN) ................... 2016 1 0509666

(51) Int. Cl.
*G06F 15/173* (2006.01)
*H04L 29/06* (2006.01)
*H04L 29/08* (2006.01)

(52) U.S. Cl.
CPC ............. *H04L 69/03* (2013.01); *H04L 67/10* (2013.01); *H04L 67/34* (2013.01)

(58) Field of Classification Search
CPC .......... H04L 69/03; H04L 67/10; H04L 67/34
See application file for complete search history.

(56) References Cited

U.S. PATENT DOCUMENTS

| 2014/0337429 | A1* | 11/2014 | Asenjo ................. H04L 65/403 709/204 |
| 2015/0169340 | A1* | 6/2015 | Haddad ............... G06F 9/45533 718/1 |
| 2015/0334033 | A1* | 11/2015 | Wang ...................... H04L 47/38 370/389 |
| 2016/0191389 | A1* | 6/2016 | Kobayashi ............. H04L 47/10 370/235 |
| 2016/0226732 | A1* | 8/2016 | Kim ..................... H04L 12/2807 |
| 2016/0261481 | A1* | 9/2016 | Ogata ................ G05B 23/0264 |
| 2017/0063968 | A1* | 3/2017 | Kitchen ................. H04L 67/10 |

FOREIGN PATENT DOCUMENTS

CN    105629790 A    6/2016

* cited by examiner

*Primary Examiner* — Suraj M Joshi
*Assistant Examiner* — Ayele F Woldemariam
(74) *Attorney, Agent, or Firm* — Miller, Mathias & Hull LLP

(57) ABSTRACT

The present application discloses a data processing method and apparatus for performing protocol parsing in the cloud. A specific implementation of the method includes: acquiring a slave station data reading rule table that is configured by a user in the cloud; downloading the slave station data reading rule table to a gateway in a slave station; receiving slave station data that is associated with the slave station and that is read by the gateway according to the slave station data reading rule table; parsing the slave station data according to a parsing table in the cloud preset by the user; and processing the parsed slave station data. This implementation implements the processing of data of different communication protocols in the cloud.

16 Claims, 5 Drawing Sheets

DATA PROCESSING METHOD AND APPARATUS FOR PERFORMING PROTOCOL PARSING IN A CLOUD

CROSS-REFERENCE TO RELATED APPLICATION

This application claims the priority of Chinese Patent Application No. 201610509666.9, entitled "Data Processing Method and Apparatus For Performing Protocol Parsing in a Cloud," filed on Jul. 1, 2016, the content of which is incorporated herein by reference in its entirety.

TECHNICAL FIELD

The present application relates to the field of computer technology, specifically to the field of Internet technology, and more specifically to a data processing method and apparatus for performing protocol parsing in a cloud.

BACKGROUND

At present, with the development of automatic control and network technologies, most factories employ a control system that integrates management and control. Such systems involve excessive data exchange and processing. Most factories are still using a conventional data acquisition method, whereby data on a field bus in the field needs to be connected to an external network through a dedicated gateway, and software/hardware service, for example, through a virtual private network (VPN) gateway and a VPN service, and then connected to an enterprise management and control apparatus through an enterprise firewall and an enterprise intranet. To ensure the security of the entire network, dedicated gateways and software/hardware services, an enterprise firewall, and matching operating system software need to be purchased in order to connect to remote devices, and to implement the collection and application of data of the industrial equipment. However, such devices and services are expensive, and need IT professionals to configure and install the dedicated gateways and software/hardware services and adjust the security policy. In addition, these dedicated gateways and software/hardware services require a complex configuration and installation process, and are difficult to adjust once the configuration is completed. Improper configuration may cause the entire factory network to be exposed to network attacks. If there are more than one factory, data from different factories will form isolated information islands using the conventional approach, leading to the problems of long development period, inflexible configuration, and poor scalability.

SUMMARY

An objective of the present application is to provide an improved data processing method and apparatus for performing protocol parsing in the cloud, so as to solve the technical problems mentioned in the Background section.

According to a first aspect, the present application provides a data processing method for performing protocol parsing in a cloud, the method comprising: acquiring a slave station data reading rule table configured in a cloud by a user; downloading the slave station data reading rule table to a gateway in a slave station, the slave station being a terminal device connected to the cloud through the gateway; receiving slave station data associated with the slave station and read by the gateway according to the slave station data reading rule table; parsing the slave station data according to a parsing table preset in the cloud by the user; and processing the parsed slave station data.

In some embodiments, the downloading the slave station data reading rule table to a gateway in a slave station comprises: publishing the slave station data reading rule table to a first message topic of the slave station, the first message topic of the slave station being a data storage area for storing server messages preset by the slave station; and subscribing automatically, through the gateway running in the slave station, to the first message topic, and obtaining the slave station data reading rule table from the first message topic.

In some embodiments, the receiving slave station data that is associated with the slave station and that is read by the gateway according to the slave station data reading rule table comprises: sending a data reading request to the slave station through the gateway; detecting response information of the slave station; and receiving the slave station data of the slave station based on the response information.

In some embodiments, the receiving the data of the slave station according to the response information comprises: determining whether the response information comprises information indicating that the slave station data can be read; and acquiring the slave station data from a second message topic preset by the slave station if the response information comprises the information indicating that the slave station data can be read, wherein the second message topic is a data storage area preset by the slave station for storing slave station device data messages.

In some embodiments, the parsing the slave station data according to a parsing table preset in the cloud by the user comprises: extracting a device communication address corresponding to the slave station data; comparing the device communication address with a device address in a parsing table in the cloud preset by the user, and generating a comparison result; searching, based on the comparison result, the parsing table for a device address identical to the device communication address, and using the device address as a slave station address, wherein the parsing table shows a correspondence between parsing modes and device addresses; and acquiring a parsing mode corresponding to the device address in the parsing table, the device address being identical to the slave station address, and parsing the slave station data by using the parsing mode.

In some embodiments, the processing the parsed slave station data comprises: storing the parsed slave station data, or sending the parsed slave station data to a data application service for use by the data application service, wherein the data application service is an operation application of data operation.

According to a second aspect, the present application provides a data processing apparatus for performing protocol parsing in a cloud, the apparatus comprising: an acquiring unit, configured to acquire a slave station data reading rule table configured in a cloud by a user; a downloading unit, configured to download the slave station data reading rule table to a gateway in a slave station, wherein the slave station is a terminal device that is connected to the cloud through the gateway; a receiving unit, configured to receive slave station data that is associated with the slave station and that is read by the gateway according to the slave station data reading rule table; a parsing unit, configured to parse the slave station data according to a parsing table in the cloud preset by the user; and a processing unit, configured to process the parsed slave station data.

In some embodiments, the downloading unit comprises: a publishing module, configured to publish the slave station data reading rule table to a first message topic of the slave station, the first message topic of the slave station being a data storage area for storing server messages preset by the slave station; and a subscription module, configured to automatically subscribe, through the gateway running in the slave station, to the first message topic, and obtain the slave station data reading rule table from the first message topic.

In some embodiments, the receiving unit is further configured to: send a data reading request to the slave station through the gateway; detect response information of the slave station; and receive the slave station data of the slave station based on the response information.

In some embodiments, the receiving unit is further configured to: determine whether the response information comprises information indicating that the slave station data can be read; and acquire the slave station data from a second message topic preset by the slave station if the response information comprises the information indicating that the slave station data can be read, wherein the second message topic is a data storage area preset by the slave station for storing slave station device data messages.

In some embodiments, the parsing unit is further configured to: extract a device communication address corresponding to the slave station data; compare the device communication address with a device address in a parsing table in the cloud preset by the user, and generate a comparison result; search, based on the comparison result, the parsing table for a device address identical to the device communication address, and use the device address as a slave station address, wherein the parsing table shows a correspondence between parsing modes and device addresses; and acquire a parsing mode corresponding to the device address in the parsing table, the device address being identical to the slave station address, and parse the slave station data by using the parsing mode.

In some embodiments, the processing unit is further configured to: store the parsed slave station data, or send the parsed slave station data to a data application service for use by the data application service, wherein the data application service is an application of data operation.

According to the data processing method and apparatus for performing protocol parsing in a cloud that are provided in the present application, data of each slave station in a system is transmitted to a cloud server, a method for parsing the slave station data is selected at the cloud server, the slave station data is parsed by using the determined parsing method, and finally the parsed slave station data is stored in a preset storage area or forwarded to a preset application service for processing. Whereby, efficient data parsing and flexible device configuration are implemented.

BRIEF DESCRIPTION OF THE DRAWINGS

Other features, purposes and advantages of the present application will become more apparent from a reading of the detailed description of the non-limiting embodiments, said description being given in relation to the accompanying drawings, among which.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
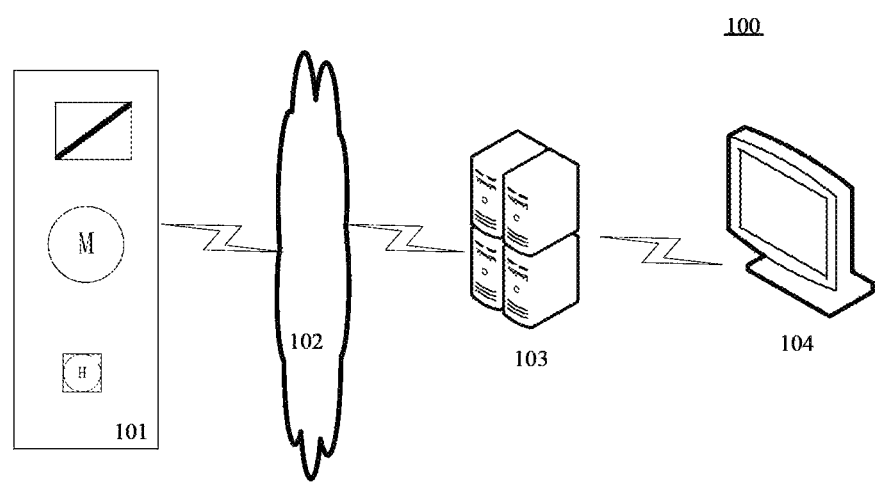
FIG. 1 is a diagram illustrating an exemplary system architecture to which the present application can be applied.

FIG. 1 shows an exemplary system architecture 100 to which a data processing method for performing protocol parsing in the cloud or a data processing apparatus for performing protocol parsing in the cloud according to an embodiment of the present application can be applied.

As shown in FIG. 1, the system architecture 100 may include a slave station 101, a network 102, a server 103, and a browsing application device 104. The network 102 is a medium for providing a communication link between the slave station 101 and the server 103. The network 102 may include various connection types, such as wired and wireless communication links or optical fiber cables.

The user may use the slave station 101 to interact with the server 103 and the browsing application device 104 through the network 102, to receive or send a message or the like.

The slave station 101 is a terminal device that is connected to a cloud through a gateway. The slave station 101 may be connected to the gateway in a Transmission Control Protocol (TCP) or serial interface manner. Herein, the slave station 101 may be an electronic device having a control function and supporting information transmission, including, but not limited to, a Programmable Logic Controller (PLC), a Supervisory Control And Data Acquisition (SCADA), a Distributed Control System (DCS), or instruments/meters having a control function, or a system formed by integrating one or more of control systems such as the above-mentioned PLC, the above-mentioned SCADA, and the above-mentioned DCS, or an independent data collection device/module. The above-mentioned slave station 101 further includes a slave station device. Herein, the slave station device includes at least one of the following: a sensing detection apparatus, a driving apparatus, a control apparatus, and other auxiliary apparatuses.

The server 103 may be a server providing various services, for example, a processing server for parsing data provided by the slave station 101. The above-mentioned processing server may send reading information for reading data of the slave station 101, and parse or otherwise process the slave station data that is read, and send the processing result (for example, the parsed data) to the browsing application device 104 or the slave station 101. Alternatively, the above-mentioned server 103 may be a cloud server having a cloud Internet of Things service. The slave station 101 may exchange information with each slave station and cloud server through the above-mentioned cloud server. The cloud server may perform an operation such as data parsing and data processing. Herein, the cloud refers to a network side, and the cloud server is a server collaboratively working with multiple servers that communicate through the network.

the browsing application device 104 may be an electronic device having a display screen and supporting various application-type services, including, but not limited to, an upper computer of an industrial control system, an industrial control machine, and a monitoring management computer. The various application-type services may be application services of various control-type software, monitoring application-type software, and management application-type software.

It should be noted that the data processing method for performing protocol parsing in the cloud that is provided in this embodiment of the present application is generally executed by the server 103. Correspondingly, the data processing apparatus for performing protocol parsing in the cloud is generally disposed in the server 103.

It should be appreciated that the number of slave stations, the number of networks, the number of servers, and the number of browsing application devices in FIG. 1 are merely exemplary. Any number of slave stations, networks, servers, and browsing application devices may be set according to implementation requirements.

Figure 2:
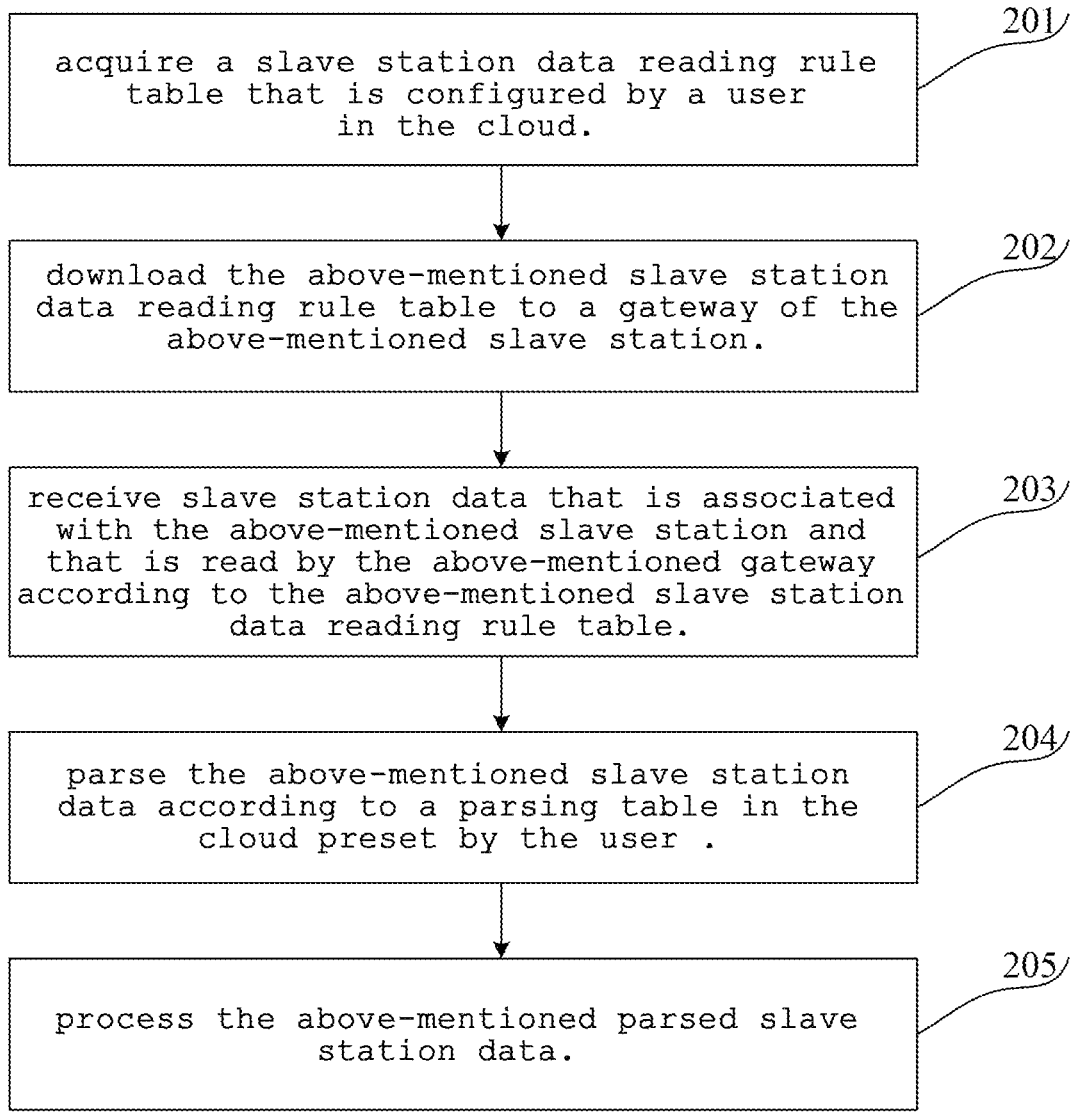
FIG. 2 is a flow chart of a data processing method for performing protocol parsing in the cloud according to an embodiment of the present application.

Further, referring to FIG. 2, FIG. 2 shows a flow 200 of a data processing method for performing protocol parsing in the cloud according to an embodiment of the present application. The data processing method for performing protocol parsing in the cloud includes the following steps:

Step 201. Acquire a slave station data reading rule table that is configured by a user in the cloud.

In this embodiment, an electronic device (for example, the server shown in FIG. 1) on which the data processing method for performing protocol parsing in the cloud is run may acquire, by means of wired connection or wireless connection, the slave station data reading rule table that is configured by the user in the cloud. The above-mentioned user may be management or technical personnel of the system. The above-mentioned slave station data reading rule table is set according to operation rights of the above-mentioned user to the system. The above-mentioned slave station data reading rule table is a list preset in the cloud by the user. The above-mentioned slave station data reading rule table lists policies for reading data of the slave station, for example, a reading mode of the slave station data, and a reading time interval of the slave station data. Herein, the reading mode of the slave station data is the manner in which the above-mentioned slave station data is read. The reading mode of the above-mentioned slave station data may be a polling mode or an interrupt mode. The reading time interval of the slave station data refers to a time interval at which the slave station data is read in the case of the above-mentioned polling reading mode. The polling mode means that data of the slave station is read in sequence; the interrupt mode means that an interrupt signal is sent when data of a slave station is ready and the above-mentioned server reads the data of the slave station upon receiving the above-mentioned interrupt signal. As an example, a reading mode of slave station data in a control and management system of a factory may be set to the polling mode, and the interval of data reading may be set to 30 seconds, that is, the above-mentioned server completes reading of data of the above-mentioned slave station once every 30 seconds. The above-mentioned electronic device may acquire the slave station data reading rule table that is configured by the user from an area specified by the cloud.

Step 202. Deliver the above-mentioned slave station data reading rule table to a gateway of the above-mentioned slave station.

In this embodiment, based on the slave station data reading rule table obtained at step 201, the above-mentioned electronic device (for example, the server shown in FIG. 1) may deliver the above-mentioned slave station data reading rule table to the gateway of the above-mentioned slave station. The gateway of the above-mentioned slave station may be an apparatus that connects the slave station and the cloud and forwards data of the slave station to the cloud. Herein, the gateway may be a network connection device that implements network interconnection at the network layer, or may be a network connection device used for wide area network interconnection or local area network interconnection. The above-mentioned gateway may be a network device that inherently has multiple protocol parsing functions to implement the communication between networks having different network protocols. As an example, the above-mentioned gateway may be a router or a Wireless Fidelity (WiFi) module. The above-mentioned electronic device may deliver the above-mentioned slave station data reading rule table to the above-mentioned gateway through a delivery channel of the cloud. Herein, the above-mentioned delivery channel may be an information channel for transmitting data or information by using a network protocol. The above-mentioned delivery channel may be an information transmission channel of the Message Queuing Telemetry Transport (MQTT) communication protocol, an information transmission channel of the HyperText Transfer Protocol (HTTP) network protocol, or an information transmission channel of the web socket communication protocol.

In some optional implementations of this embodiment, the above-mentioned electronic device may deliver the above-mentioned slave station data reading rule table to the gateway of the above-mentioned slave station through the following steps: first publishing the above-mentioned slave station data reading rule table to a first message topic of the above-mentioned slave station; and then automatically subscribing, through the above-mentioned gateway running in the slave station, to the above-mentioned first message topic, and obtaining the above-mentioned slave station data reading rule table from the above-mentioned first message topic. The first message topic of the above-mentioned slave station is a data storage area that is preset in the above-mentioned slave station for receiving and storing messages published by the above-mentioned server. The above-mentioned electronic device may publish, according to serial number information or other distinguishing information, the above-mentioned slave station data reading rule table to the first message topic of the slave station corresponding to the above-mentioned serial number information or other distinguishing information. The gateway of the above-mentioned slave station automatically subscribes to the above-mentioned first message topic and obtains the above-mentioned slave station data reading rule table. Herein, when content in the above-mentioned first message topic is updated, the above-mentioned gateway automatically acquires the content in the first message topic, and obtains the slave station data reading rule table of the above-mentioned slave station from the above-mentioned content.

Step 203. Receive slave station data that is associated with the above-mentioned slave station and that is read by the above-mentioned gateway according to the above-mentioned slave station data reading rule table.

In this embodiment, the electronic device on which the data processing method for performing protocol parsing in the cloud is run may receive data associated with the above-mentioned slave station. The above-mentioned slave station data may be data detected by a sensing device in the above-mentioned slave station, or may be data of a slave station device having data storage and computing functions in the above-mentioned slave station. Herein, the data of the above-mentioned slave station device may be data stored in a storage unit of the above-mentioned slave station, data obtained after computing by the above-mentioned slave station, or data that describes the state of the above-mentioned slave station device. The above-mentioned gateway determines a reading rule of the above-mentioned slave station data according to the slave station data reading rule table delivered at step 202. The above-mentioned slave station reads the above-mentioned slave station data according to the determined reading rule. The above-mentioned electronic device receives the above-mentioned slave station data.

In some optional implementations of this embodiment, that the above-mentioned electronic device receives slave station data that is associated with the above-mentioned slave station and that is read by the above-mentioned gateway according to the above-mentioned slave station data reading rule table may be implemented in the following manner: The above-mentioned electronic device sends a data reading request to the above-mentioned slave station through the above-mentioned gateway. Herein, the data reading request is sent to the above-mentioned slave station according to the reading rule such as the data reading mode and reading time interval that is determined by the above-mentioned slave station data reading rule table. The above-mentioned electronic device detects response information of the above-mentioned slave station to the above-mentioned data reading request, and determines whether a criterion in the above-mentioned response information for identifying that data is ready is satisfied, for example, determines whether a criterion in the response information for identifying that particular bit information, byte information or other information is ready is satisfied. According to the above-mentioned determining result, when the criterion in the response information for identifying that data is ready is satisfied, the above-mentioned electronic device receives the slave station data of the above-mentioned slave station.

In some optional implementations of this embodiment, the receiving the data of the above-mentioned slave station according to the above-mentioned response information may be: determining whether the above-mentioned response information includes information indicating that the slave station data can be read; and acquiring the slave station data from a second message topic preset by the above-mentioned slave station if the response information includes the information indicating that the slave station data can be read, wherein the above-mentioned second message topic is a data storage area preset by the above-mentioned slave station for storing slave station device data messages. Herein, the above-mentioned gateway publishes the data of the above-mentioned slave station device associated with the slave station to the above-mentioned second message topic through a communication protocol specified by the slave station, and when the above-mentioned response information includes information indicating that the slave station data can be read, the above-mentioned electronic device acquires the slave station data from the second message topic. Herein, the communication protocol specified by the slave station may be a communication protocol of an electrical control system such as TCP and RS-232, or may be a field-bus communication protocol such as ModBus communication protocol and ProfiBus communication protocol.

Step 204. Parse the above-mentioned slave station data according to a parsing table preset in the cloud by the user.

In this embodiment, the above-mentioned electronic device may parse the above-mentioned slave station data received at step 203. The above-mentioned parsing table may be a list in the cloud preset by the user, and the above-mentioned parsing table lists methods or formulas used for parsing the above-mentioned data. By combining the slave station data with the above-mentioned parsing table, the above-mentioned slave station data can be converted into data that is directly readable or available. The parsing table may include multiple parsing methods, and data in one slave station may be parsed using a same parsing method or different parsing methods. The parsing the slave station data may be removing communication data from the slave station data, so as to obtain functional data associated with the slave station, such as the model of the slave station device, the type of the slave station device, or data detected by the slave station device. Alternatively, the parsing the slave station data may be converting the functional data associated with the slave station, which is obtained by removing the communication data from the above-mentioned slave station data, into data that is machine-recognizable or directly available. As an example, the data of the above-mentioned slave station may use one byte to identify the value of a voltage. Assuming the value of the byte is 8245, voltage data of the above-mentioned slave station data can be parsed out according to the parsing table of the above-mentioned slave station, and the voltage value is 1.5 V.

Step 205. Process the above-mentioned parsed slave station data.

In this embodiment, when processing the above-mentioned parsed slave station data, the above-mentioned electronic device may store the above-mentioned parsed slave station data, or forwards the above-mentioned parsed slave station data to an application processing service of the system, for example, parses data detected by a temperature detection device in the slave station, converts the data into a temperature value, and displays the temperature value on the display screen in a numeral form.

Figure 3:
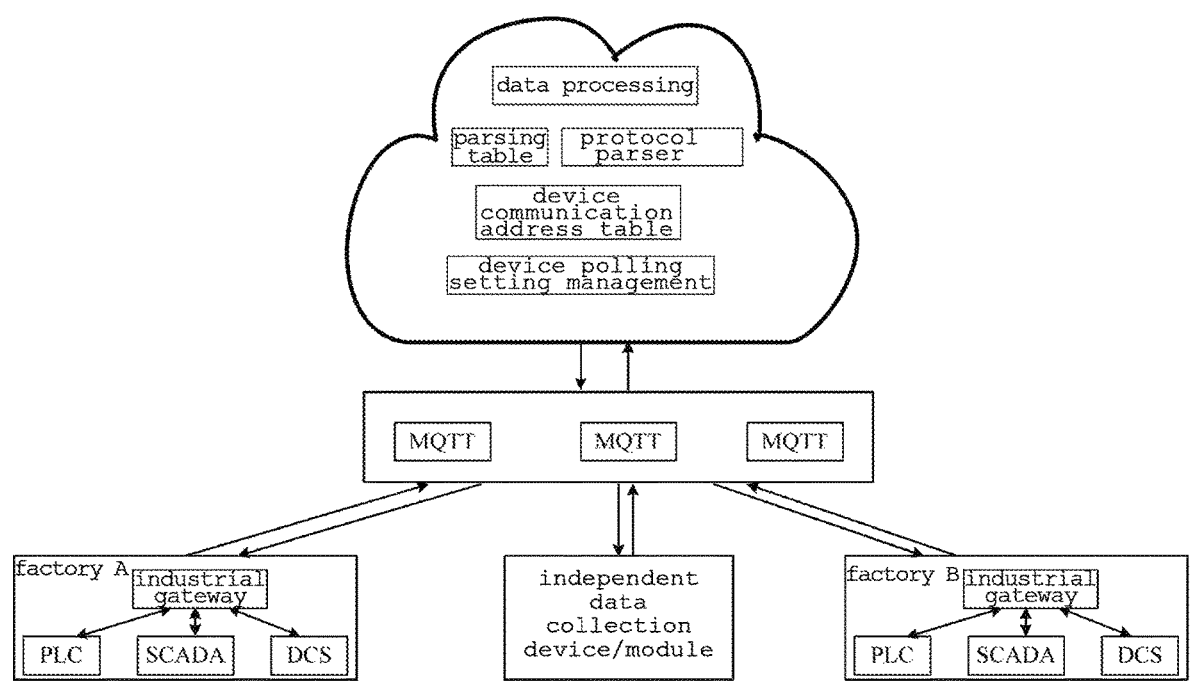
FIG. 3 is a schematic diagram of an application scenario of a data processing method for performing protocol parsing in the cloud according to the present application.

Further, referring to FIG. 3, FIG. 3 is a schematic diagram of an application scenario of a data processing method for performing protocol parsing in the cloud according to this embodiment. In the application scenario of FIG. 3, a user configures data reading rules for a factory A, a factory B, and an independent data collection device respectively in the cloud. The above-mentioned factory A, the above-mentioned factory B, and the above-mentioned independent data collection device are three different slave stations. The user sets data reading rules for the slave stations according to transmission requirements of slave station data to form a slave station data reading rule table. The above-mentioned slave station data reading rule table is delivered to a first message topic of the slave station. Gateways of the above-mentioned factory A, the above-mentioned factory B, and the above-mentioned independent data collection device automatically subscribe to the above-mentioned first message topic, and send a data reading request to production equipment of the factory A, the factory B, and the independent data collection device according to rules in the slave station data reading rule table obtained by subscribing to the first message topic. The above-mentioned factory A, the above-mentioned factory B, and the above-mentioned independent data collection device respond to the above-mentioned data reading request, and upload response data to the gateways of the corresponding slave stations. For example, a production data reading request is sent to a PLC of the factory A, and the PLC of the above-mentioned factory A uploads data of the above-mentioned PLC to a second message topic specified by the gateway in response to the above-mentioned reading request. The above-mentioned electronic device reads the response data of the above-mentioned factory A, the above-mentioned factory B, and the above-mentioned independent data collection device from the above-mentioned second message topic, and parses the above-mentioned response data according to the parsing table. Herein, the response data of the above-mentioned factory A, the above-mentioned factory B, and the above-mentioned independent data collection device may be parsed by using a same or different parsing methods. The parsed data is stored or sent to a service application of the system. For example, the parsed data of the PLC of the above-mentioned factory A may be presented on a monitoring device as a temperature value for temperature monitoring.

The method provided in the above-mentioned embodiment of the present application, by setting a slave station data collection rule in the cloud, directly receiving slave station data of a slave station according to the set rule, and then parsing the data in the cloud according to a parsing table, reduces intermediate conversion processes during factory data collection, thereby improving the collection efficiency and flexibility.

Figure 4:
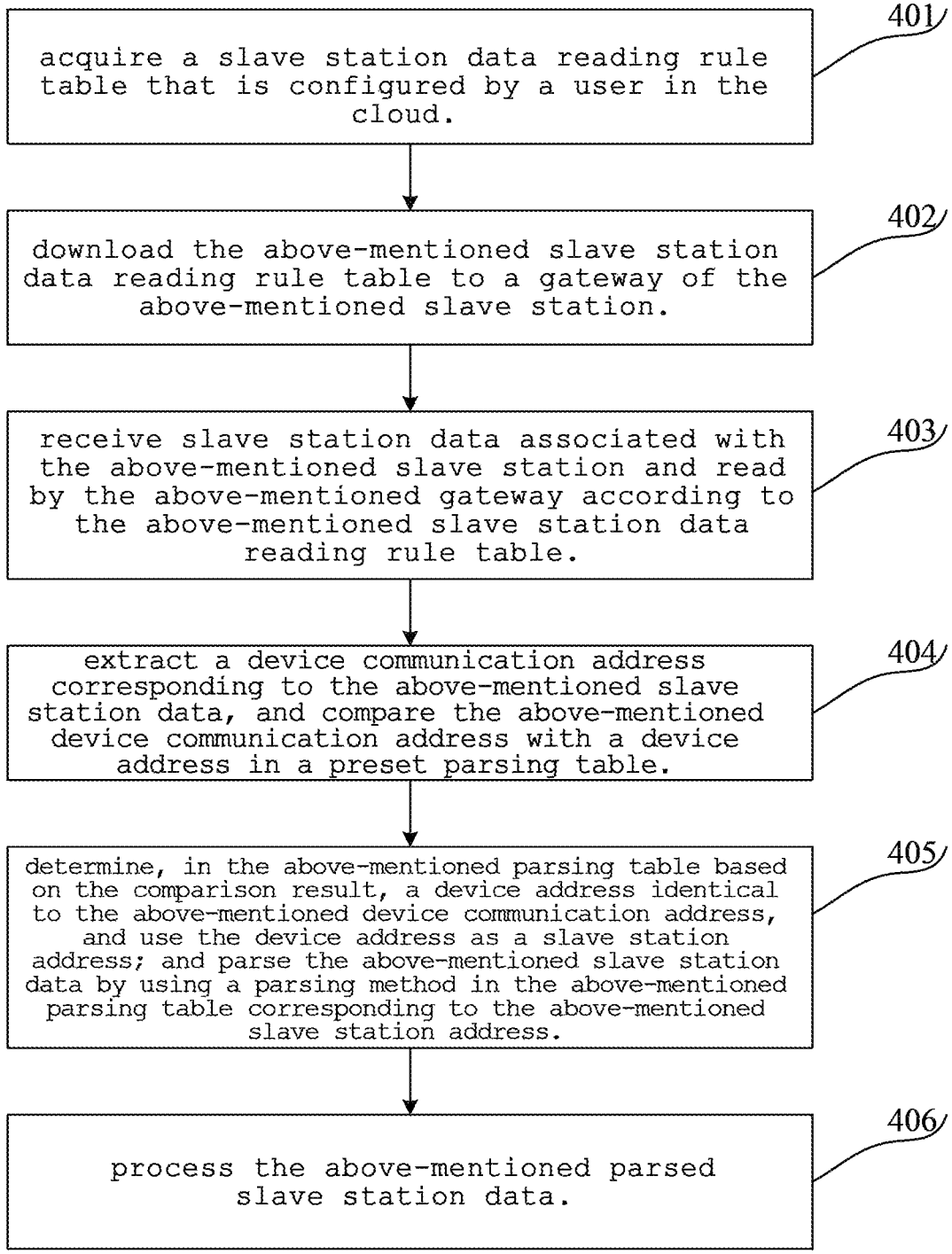
FIG. 4 is a flow chart of a data processing method for performing protocol parsing in the cloud according to another embodiment of the present application.

Further, referring to FIG. 4, FIG. 4 shows a flow 400 of a data processing method for performing protocol parsing in the cloud according to another embodiment. The flow 400 of the data processing method for performing protocol parsing in the cloud includes the following steps:

Step 401. Acquire a slave station data reading rule table that is configured by a user in the cloud.

In this embodiment, an electronic device (for example, the server shown in FIG. 1) on which the data processing method for performing protocol parsing in the cloud is run may acquire, by means of wired connection or wireless connection, the slave station data reading rule table that is configured by the user in the cloud. The above-mentioned slave station data reading rule table lists policies for reading data of the slave station, for example, a reading mode of the slave station data, and a reading time interval of the slave station data.

Step 402. Deliver the above-mentioned slave station data reading rule table to a gateway of the above-mentioned slave station.

In this embodiment, based on the slave station data reading rule table obtained at step 401, the above-mentioned electronic device (for example, the server shown in FIG. 1) may first deliver the above-mentioned slave station data reading rule table to the gateway of the above-mentioned slave station. The gateway of the above-mentioned slave station refers to an apparatus that connects the slave station and the cloud and forwards data of the slave station to the cloud.

Step 403. Receive slave station data that is associated with the above-mentioned slave station and that is read by the above-mentioned gateway according to the above-mentioned slave station data reading rule table.

In this embodiment, the electronic device on which the data processing method for performing protocol parsing in the cloud is run may receive data associated with the above-mentioned slave station. The above-mentioned slave station data may be data detected by a sensing device in the above-mentioned slave station, or may be data of a slave station device having data storage and computing functions in the above-mentioned slave station. The above-mentioned gateway determines a reading rule of the above-mentioned slave station data according to the slave station data reading rule table delivered at step 402. The above-mentioned slave station reads the above-mentioned slave station data according to the determined reading rule. The above-mentioned electronic device receives the above-mentioned slave station data.

Step 404. Extract a device communication address corresponding to the above-mentioned slave station data, and compare the above-mentioned device communication address with a device address in a preset parsing table.

In this embodiment, the slave station data received in the above-mentioned step 403 is decomposed, so as to obtain a device communication address corresponding to the above-mentioned slave station data from the above-mentioned slave station data. A device corresponding to the above-mentioned slave station data refers to a device that generates the above-mentioned slave station data in the slave station. The above-mentioned slave station data contains a communication address corresponding to the above-mentioned slave station data. Herein, the communication address of the above-mentioned slave station data may be numbered in advance the number of slave stations and the number of devices in the slave stations. A parsing table is preset in a buffer of the above-mentioned electronic device. The above-mentioned parsing table includes multiple data parsing methods and device addresses. Data of each device address corresponds to one data parsing method, and each data parsing method may be used for parsing data of multiple device addresses. The comparing the above-mentioned device communication address with a device address in a preset parsing table may be searching the above-mentioned parsing table to determine whether there is a device address the same as the above-mentioned communication address.

Step 405. Determine, in the above-mentioned parsing table according to the comparison result, a device address that is the same as the above-mentioned device communication address, and use the device address as a slave station address; and parse the above-mentioned slave station data by using a parsing method in the above-mentioned parsing table corresponding to the above-mentioned slave station address.

In this embodiment, according to the comparison result at step 404, a device address the same as the above-mentioned communication address is found from the device addresses in the parsing table, and the above-mentioned device address that is the same as the above-mentioned communication address is used as a slave station address. The parsing table shows a correspondence between parsing modes and device addresses. The parsing mode in the parsing table corresponding to the above-mentioned slave station address is a mode for parsing the above-mentioned slave station data. Herein, the parsing mode may be a data parsing mode or method of an existing communication protocol, or may be a data parsing mode or method defined by the user.

Step 406. Process the above-mentioned parsed slave station data.

In this embodiment, when processing the above-mentioned parsed slave station data, the above-mentioned electronic device may store the above-mentioned parsed slave station data, or forwards the above-mentioned parsed slave station data to an application processing service of the system, for example, parses data detected by a temperature detection device in the slave station, converts the data into a temperature value, and displays the temperature value on the display screen in a numeral form.

In some optional implementations of this embodiment, the above-mentioned electronic device may store the parsed slave station data, or send the above-mentioned parsed slave station data to a data application service. The data application service may be an operation application of data. Herein, the storing the above-mentioned parsed slave station data may be storing the above-mentioned data in a database, for use in subsequent control or management processes. For example, the above-mentioned slave station data may be stored in a preset relational database or a Not Only SQL (NoSQL) database; or the above-mentioned data may be stored in a real-time database or an object database. The sending the above-mentioned parsed slave station data to a data application service may be sending the data to a real-time application of the device data. For example, the above-mentioned data may be forwarded to a preset visualized real-time operation application service for visualization processing; or the above-mentioned data may be forwarded to a preset real-time computing application service for real-time computing; or the above-mentioned data may be forwarded to an application service established by another user for processing.

As can be seen from FIG. 4, compared with the embodiment corresponding to FIG. 2, the flow 400 of the data processing method for performing protocol parsing in the cloud in this embodiment highlights the selection of a parsing method from the parsing table according to the address of the data source. Whereby, the collection and processing of slave station data can be simply and flexibly implemented.

Figure 5:
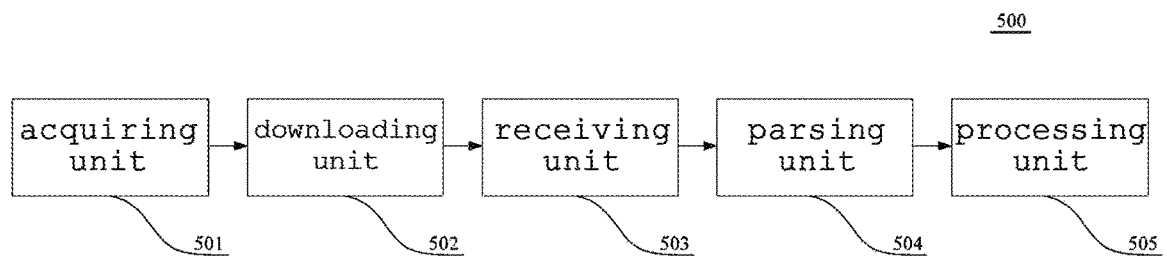
FIG. 5 is a schematic structural diagram of a data processing apparatus for performing protocol parsing in the cloud according to an embodiment of the present application.

Further, referring to FIG. 5, as an implementation of the methods shown in the above-mentioned figures, the present application provides an embodiment of a data processing apparatus for performing protocol parsing in the cloud. This apparatus embodiment corresponds to the method embodiment shown in FIG. 2. The apparatus may be specifically applied to various electronic devices.

As shown in FIG. 5, the data processing apparatus 500 for performing protocol parsing in the cloud according to this embodiment includes: an acquiring unit 501, a downloading unit 502, a receiving unit 503, a parsing unit 504, and a processing unit 505. The acquiring unit 501 is configured to acquire a slave station data reading rule table that is configured by a user in the cloud. The downloading unit 502 is configured to deliver the above-mentioned slave station data reading rule table to a gateway of the above-mentioned slave station. The receiving unit 503 is configured to receive slave station data that is associated with the above-mentioned slave station and that is read by above-mentioned gateway according to the above-mentioned slave station data reading rule table. The parsing unit 504 is configured to parse the above-mentioned slave station data according to a parsing table preset in the cloud by the user. The processing unit 505 is configured to process the above-mentioned parsed slave station data.

In this embodiment, the acquiring unit 501 in the data processing apparatus 500 for performing protocol parsing in the cloud may acquire, by means of wired connection or wireless connection, the slave station data reading rule table that is configured by the user in the cloud.

In this embodiment, based on the slave station data reading rule table that is acquired by the acquiring unit 501, the above-mentioned downloading unit 502 may deliver the above-mentioned slave station data reading rule table to the gateway of the above-mentioned slave station. The gateway of the above-mentioned slave station refers to an apparatus that connects the slave station and the cloud and forwards data of the slave station to the cloud.

In this embodiment, the above-mentioned receiving unit 503 may receive data associated with the above-mentioned slave station. The above-mentioned slave station data may be data detected by a sensing device in the above-mentioned slave station, or may be data of a slave station device having data storage and computing functions in the above-mentioned slave station.

In this embodiment, the above-mentioned parsing unit 504 may parse the above-mentioned slave station data according to a parsing table previously set by the user, wherein the above-mentioned parsing table is a list preset in the cloud by the user, and the above-mentioned parsing table lists methods or formulas used for parsing the above-mentioned data.

In this embodiment, the above-mentioned processing unit 505 may store the above-mentioned parsed slave station data, or forward the above-mentioned parsed slave station data to an application processing service in a system.

In some optional implementations of this embodiment, the above-mentioned downloading unit 502 may include: a publishing module and a subscription module. The publishing module is configured to publish the above-mentioned slave station data reading rule table to a first message topic of the above-mentioned slave station. The first message topic of the above-mentioned slave station is a data storage area that is preset by the above-mentioned slave station for storing server messages. The subscription module is configured to automatically subscribe, through the gateway running in the slave station, to the above-mentioned first message topic, and obtain the above-mentioned slave station data reading rule table from the above-mentioned first message topic.

In some optional implementations of this embodiment, the above-mentioned receiving unit 503 may be further configured to: send a data reading request to the above-mentioned slave station through the above-mentioned gateway; detect response information of the above-mentioned slave station; and receive the slave station data of the above-mentioned slave station according to the above-mentioned response information.

In some optional implementations of this embodiment, the above-mentioned receiving unit 503 may be further configured to: determine whether the above-mentioned response information includes information indicating that the slave station data can be read; and acquire the slave station data from a second message topic that is preset by the above-mentioned slave station if the above-mentioned response information includes the information indicating that the slave station data can be read, wherein the second message topic is a data storage area that is preset by the slave station for storing slave station device data messages.

In some optional implementations of this embodiment, the above-mentioned parsing unit 504 may be further configured to: extract a device communication address corresponding to the above-mentioned slave station data; compare the above-mentioned device communication address with a device address in a preset parsing table; determine, in the above-mentioned parsing table according to the comparison result, a device address that is the same as the above-mentioned device communication address, and use the device address as a slave station address; and parse the slave station data by using a parsing method in the parsing table corresponding to the above-mentioned slave station address.

In some optional implementations of this embodiment, the above-mentioned processing unit 505 may be further configured to: store the above-mentioned parsed slave station data, or send the above-mentioned parsed slave station data to a data application service, wherein the above-mentioned data application service is an operation application of data.

Figure 6:
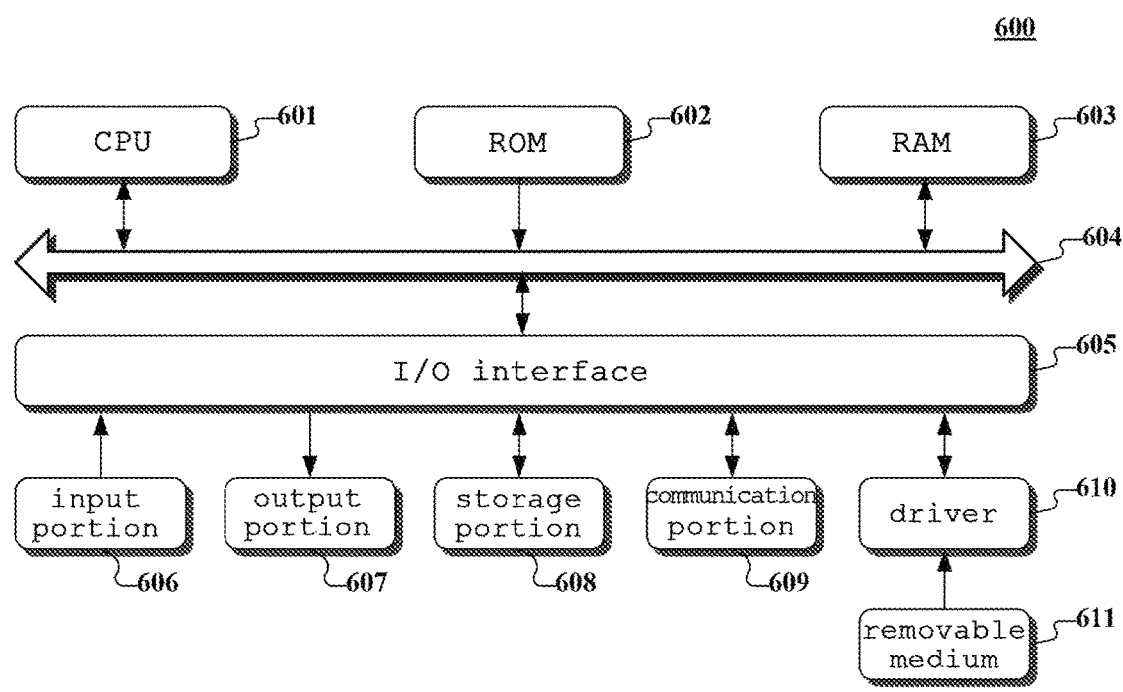
FIG. 6 is a schematic structural diagram of a computer system adapted to implement a server according to an embodiment of the present application.

Referring to FIG. 6, a schematic structural diagram of a computer system 600 adapted to implement a server of the embodiments of the present application is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present application.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising an acquiring unit, a downloading unit, a receiving unit, a parsing unit and a processing unit, where the names of these units or modules are not considered as a limitation to the units or modules. For example, the acquiring unit may also be described as "a unit for acquiring a slave station data reading rule table configured in a cloud by a user."

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: acquire a slave station data reading rule table configured in a cloud by a user; download the slave station data reading rule table to a gateway in a slave station, the slave station being a terminal device connected to the cloud through the gateway; receive slave station data associated with the slave station and read by the gateway according to the slave station data reading rule table; parse the slave station data according to a parsing table preset in the cloud by the user; and process the parsed slave station data.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A data processing method for performing protocol parsing in a cloud, the method comprising:
   acquiring a slave station data reading rule table configured in a cloud by a user, the slave data reading rule comprising a manner of reading slave station data of a slave station;
   downloading the slave station data reading rule table from the cloud to a gateway in the slave station, the slave station being a terminal device connected to the cloud through the gateway, wherein the downloading the slave station data reading rule table to a gateway in a slave station comprises:

publishing the slave station data reading rule table to a first message topic of the slave station, the first message topic of the slave station being a data storage area preset in the slave station for storing server messages, and subscribing automatically, through the gateway running in the slave station, to the first message topic, and obtaining the slave station data reading rule table from the first message topic;

receiving slave station data associated with the slave station and read by the gateway according to the slave station data reading rule table;

parsing the slave station data according to a parsing table preset in the cloud by the user; and processing the parsed slave station data, wherein the parsing the slave station data according to a parsing table preset in the cloud by the user comprises:

extracting a device communication address of a salve station;

comparing the device communication address with device addresses in a parsing table stored in the cloud, the parsing table including a correspondence between device addresses and parsing modes for parsing the slave station data;

determining a device address identical to the device communication address in the parsing table based on comparison;

determining a parsing mode corresponding to the device address identical to the device communication address based on the parsing table.

2. The data processing method for performing protocol parsing in a cloud according to claim 1, wherein the receiving slave station data associated with the slave station and read by the gateway according to the slave station data reading rule table comprises:

sending a data reading request to the slave station through the gateway;

detecting response information of the slave station; and receiving the slave station data of the slave station based on the response information.

3. The data processing method for performing protocol parsing, in a cloud according to claim 2, wherein the receiving the data of the slave station based on the response information comprises:

determining whether the response information comprises information indicating that the slave station data can be read; and acquiring the slave station data from a second message topic preset by the slave station if the response information comprises the information indicating that the slave station data can be read, wherein the second message topic is a data storage area preset by the slave station for storing slave station device data messages.

4. The data processing method for performing protocol parsing in a cloud according to claim 1, wherein the processing the parsed slave station data comprises:

storing the parsed slave station data, or sending the parsed slave station data to a data application service for use by the data application service, wherein the data application service is an application of data operation.

5. A data processing apparatus for performing protocol parsing in a cloud, the apparatus comprising:

at least one processor; and a memory storing instructions, which when executed by the at least one processor, cause the at least one processor to perform operations, the operations comprising:

acquiring a slave station data reading rule table configured in a cloud by a user, the slave data reading rule comprising a manner of reading slave station data of a slave station;

downloading the slave station data reading rule table from the cloud to a gateway in the slave station, wherein the slave station is a terminal device that is connected to the cloud through the gateway, wherein the downloading the slave station data reading rule table to a gateway in a slave station comprises:

publishing the slave station data reading rule table to a first message topic of the slave station, the first message topic of the slave station being a data storage area preset in the slave station for storing server messages, and subscribing automatically, through the gateway running in the slave station, to the first message topic, and obtaining the slave station data reading rule table from the first message topic;

receiving slave station data that is associated with the slave station and that is read by the gateway according to the slave station data reading rule table;

parsing the slave station data according to a parsing table in the cloud preset by the user; and processing the parsed slave station data, wherein the parsing the slave station data according to a parsing table preset in the cloud by the user comprises:

extracting a device communication address of a salve station;

comparing the device communication address with device addresses in a parsing table stored in the cloud, the parsing table including a correspondence between device addresses and parsing modes for parsing the slave station data;

determining a device address identical to the device communication address in the parsing table based on comparison;

determining a parsing mode corresponding to the device address identical to the device communication address based, on the parsing table.

6. The data processing apparatus for performing protocol parsing in a cloud according, to claim 5, wherein the receiving slave station data associated with the slave station and read by the gateway according to the slave station data reading rule table comprises:

sending a data reading request to the slave station through the gateway;

detecting response information of the slave station; and receiving the slave station data of the slave station based on the response information.

7. The data processing apparatus for performing protocol parsing in a cloud according to claim 6, wherein the receiving the data of the slave station based on the response information comprises:

determining whether the response information comprises information indicating that the slave station data can be read; and acquiring the slave station data from a second message topic preset by the slave station if the response information comprises the information indicating that the slave station data can be read, wherein the second message topic is a data storage area preset by the slave station for storing slave station device data messages.

8. The data processing apparatus for performing protocol parsing in a cloud according to claim 5, wherein the processing the parsed slave station data comprises:
store the parsed slave station, data, or send the parsed slave station data to a data application service for use by the data application service, wherein the data application service is an application of data operation.

9. A non-transitory computer storage medium storing a computer program, which, when executed by one or more processors, cause the one or more processors to perform operations, the operations comprising:
acquiring a slave station data reading rule table configured in a cloud by a user, the slave data reading rule comprising a manner of reading slave station data of a slave station;
downloading the slave station data reading rule table from the cloud to a gateway in the station, the slave station being a terminal device connected to the cloud through the gateway, wherein the downloading the slave station data reading rule table to a gateway in a slave station comprises:
publishing the slave station data reading rule table to a first message topic of the slave station, the first message topic of the slave station being a data storage area preset in the slave station for storing server messages, and
subscribing automatically, through the gateway running in the slave station, to the first message topic, and obtaining the slave station data reading rule table from the first message topic;
receiving slave station data associated with the slave station and read by the gateway according to the slave station data reading rule table;
parsing the slave station data according to a parsing table preset in the cloud by the user; and
processing the parsed slave station data, wherein the parsing the slave station data according to a parsing table preset in the cloud by the user comprises:
extracting a device communication address of a salve station;
comparing the device communication address with device addresses in a parsing table stored in the cloud, the parsing table including a correspondence between device addresses and parsing modes for parsing the slave station data;
determining a device address identical to the device communication address in the parsing table based on comparison;
determining a parsing mode corresponding to the device address identical to the device communication address based on the parsing table.

10. The non-transitory computer storage medium according to claim 9, wherein the receiving slave station data associated with the slave station and read by the gateway according to the slave station data reading rule table comprises:
sending a data reading request to the slave station through the gateway;
detecting response information of the slave station; and
receiving the slave station data of the slave station based on the response information.

11. The non-transitory computer storage medium according to claim 10, wherein the receiving the data of the slave station based on the response information comprises:
determining whether the response information comprises information indicating that the slave station data can be read; and
acquiring the slave station data from a second message topic preset by the slave station if the response information comprises the information indicating that the slave station data can be read, wherein the second message topic is a data storage area preset by the slave station for storing slave station device data messages.

12. The non-transitory computer storage medium according to claim 9, wherein the processing the parsed slave station data comprises:
storing the parsed slave station data, or sending the parsed slave station data to a data application service for use by the data application service, wherein the data application service is an application of data operation.

13. The data processing method for performing protocol parsing in a cloud according to claim 1, wherein the manner of reading slave station data of a slave station comprises: reading slave station data of a plurality of slave stations in sequence at regular time intervals.

14. The data processing method for performing protocol parsing in a cloud according to claim 1, wherein the manner of reading slave station data of a slave station comprises: sending by the slave station an interrupt signal when the slave station data is prepared; and reading the slave station data of the slave station upon receiving the interrupt signal from the slave station.

15. The data processing method for performing protocol parsing in a cloud according to claim 1, wherein the parsing the slave station data according to a parsing table preset in the cloud by the user comprises, obtaining functional data of the slave station data by removing communication data from the slave station data, the functional data including a type of the terminal device.

16. The data processing method for performing protocol parsing in a cloud according to claim 15, wherein the parsing the slave station data according to a parsing table preset in the cloud by the user further comprises converting the functional data into machine-recognizable data.

* * * * *